(12) United States Patent
Srivastava et al.

(10) Patent No.: US 12,515,350 B2
(45) Date of Patent: Jan. 6, 2026

(54) HAND CONTROLLER FOR A ROBOTIC SURGICAL SYSTEM

(71) Applicant: SSI IP HOLDINGS INC., Fort Lauderdale, FL (US)

(72) Inventors: Sudhir Prem Srivastava, Haryana (IN); Vishwajyoti Pascual Srivastava, Haryana (IN); Anil Kumar Patidar, Haryana (IN); Yogesh Singh, Haryana (IN); Himanshu Singh, Haryana (IN)

(73) Assignee: SSI IP HOLDINGS INC., Fort Lauderdale, FL (US)

( * ) Notice: Subject to any disclaimer, the term of this patent is extended or adjusted under 35 U.S.C. 154(b) by 122 days.

(21) Appl. No.: 18/566,644

(22) PCT Filed: Feb. 8, 2023

(86) PCT No.: PCT/IN2023/050129
§ 371 (c)(1),
(2) Date: Dec. 2, 2023

(87) PCT Pub. No.: WO2023/152762
PCT Pub. Date: Aug. 17, 2023

(65) Prior Publication Data
US 2024/0253244 A1    Aug. 1, 2024

(30) Foreign Application Priority Data
Feb. 8, 2022 (IN) .............................. 202211006589

(51) Int. Cl.
*B25J 13/02* (2006.01)
*A61B 17/00* (2006.01)
(Continued)

(52) U.S. Cl.
CPC ............... *B25J 13/02* (2013.01); *A61B 34/35* (2016.02); *A61B 34/74* (2016.02)

(58) Field of Classification Search
CPC .......... B25J 13/02; A61B 34/35; A61B 34/74; A61B 2017/00424; A61B 34/37; A61B 34/71
See application file for complete search history.

(56) References Cited

U.S. PATENT DOCUMENTS

2020/0315729 A1* 10/2020 Blanco .................... F16H 21/54

FOREIGN PATENT DOCUMENTS

CN            113017840 A       6/2021

* cited by examiner

*Primary Examiner* — Harry Y Oh
(74) *Attorney, Agent, or Firm* — SZDC Law PC

(57) ABSTRACT

A hand controller assembly (200) of a console system (105) is disclosed herein. The hand controller assembly may include a backend assembly (209), where the backend assembly (209) or (301) is configured to facilitate movement of the hand controller (207b) in x, y, and z-coordinate axes. The hand controller assembly (200) further includes a left-hand controller (201a) and a right-hand controller (201b). The left and-controller (201a) includes a plurality of link members (211a) coupled to one another to form a linkage and the right-hand controller (201b) includes a plurality of link members (211b) coupled to one another to form a linkage. Proximal end of the plurality of link members (211a), (211b) is operationally secured to the backend assembly (209) and distal of the plurality of link member (211a), (211b) is operationally secured to a gimbal assembly (213a), (213b) respectively. A dovetail mount (219) is secured to a mounting plate (217c), wherein the dovetail mount (219) is configured to releasably secure the hand controller assembly (200) in the console system (105).

18 Claims, 5 Drawing Sheets

(51) Int. Cl.
*A61B 34/00* (2016.01)
*A61B 34/35* (2016.01)
*A61B 34/37* (2016.01)

HAND CONTROLLER FOR A ROBOTIC SURGICAL SYSTEM

CROSS-REFERENCE TO RELATED APPLICATIONS AND PRIORITY

This application is the national stage application of International Application No. PCT/IN2023/050129, filed on Feb. 8, 2023, which application claims priority from Indian Patent Application No. 202211006589, filed on Feb. 8, 2022.

TECHNICAL FIELD

The present disclosure generally relates to a robotic surgical system for minimally invasive surgery. More particularly, the disclosure relates to a hand controller which may be used for maneuvering robotic arms and surgical instruments for performing surgery.

BACKGROUND

This section is intended to introduce the reader to various aspects of art that may be related to various aspects of the present disclosure, which are described below. This disclosure is believed to be helpful in providing the reader with background information to facilitate a better understanding of the various aspects of the present disclosure. Accordingly, it should be understood that these statements are to be read in this light, and not just as admissions of prior art.

Robotically assisted surgical systems have been adopted worldwide to replace conventional surgical procedures to reduce amount of extraneous tissue(s) that may be damaged during surgical or diagnostic procedures, thereby reducing patient recovery time, patient discomfort, prolonged hospital tenure, and particularly deleterious side effects. In robotically assisted surgeries, the surgeon typically operates a hand controller/master controller/surgeon input device at a surgeon console/console system to seamlessly capture and transfer complex actions performed by the surgeon giving the perception that the surgeon is directly articulating surgical tools/surgical instruments to perform the surgery. The surgeon operating on the surgeon console/console system may be located at a distance from a surgical site or may be located within an operating theatre where the patient is being operated on.

The robotically assisted surgical systems comprises multiple robotic arms aiding in conducting robotic surgeries. The robotically assisted surgical system utilizes a sterile adapter/a sterile barrier to separate non-sterile section of the robotic arm from a mandatory sterile surgical tool/surgical instrument attached to the robotic arm at an operating end. The sterile adaptor/sterile barrier may include a sterile plastic drape that envelops the robotic arm and the sterile adaptor/sterile barrier that operably engages with the sterile surgical tools/surgical instrument in a sterile field.

Traditionally, the console used in the robotically assisted surgical systems are ergonomically inferior due to which the surgeon may feel fatigue during long surgical procedures. Further, the existing consoles are bulky due to which shifting the console between the operating rooms is very difficult.

In the light of aforementioned challenges, there is a need for designing a surgeon console/console system having mobility and ergonomically superior.

SUMMARY

In one general aspect, a hand controller assembly (200) may include a backend assembly (209), wherein the backend assembly (209) or (301) is configured to facilitate movement of the hand controller assembly (200) in x, y, and z-coordinate axes. The hand controller assembly further includes a left-hand controller (201a), wherein the left-hand controller (201a) includes plurality of link members (211a) coupled to one another to form a linkage, and wherein proximal end of the plurality of link members (211a) is operationally secured to the backend assembly (209) and distal end of the plurality of link member (211a) is operationally secured to a gimbal assembly (213a). Similarly, the hand controller assembly (200) includes a right-hand controller (201b), wherein the right-hand controller (201b) includes a plurality of link members (211b) coupled to one another to form a linkage, and wherein a proximal end of the plurality of link members (211b) is operationally secured to the backend assembly (209) and distal of the plurality of link member (211b) is operationally secured to a gimbal assembly (213b). A dovetail mount (219) is secured to a mounting plate (217c), wherein the dovetail mount (219) is configured to releasably secure the hand controller assembly (200) in the console system (105).

In one general aspect, first motorized joint assembly may include a plate (401). First motorized joint assembly may also include a first pulley (403). Assembly may furthermore include a first spring (405). Assembly may in addition include a first encoder assembly (502). Assembly may moreover include a first cable (406), where the first cable (406) circumscribes the first pulley (403) in a counterclockwise direction. Assembly may also include a first capstan (409), where the first capstan (409) is disposed tangential to a circumference of the first pulley (403). Assembly may furthermore include a first motor (407), where the first motor (407) is secured to an anterior side of the plate (401).

In one general aspect, second motorized joint assembly may include a second pulley (411). Second motorized joint assembly may also include a second spring (413). Assembly may furthermore include a second encoder assembly (509). Assembly may in addition include a second cable (414), where the second cable (414) circumscribes the second pulley (411) in a counterclockwise direction. Assembly may moreover include a second capstan (417), where the second capstan (417) is disposed tangential to a circumference of the second pulley (411). Assembly may also include a coupler (501) having a first end (500a) and a second end (500b), where the first end (500a) includes plurality of hole (501a) and (501c), and the second end (500b) includes a hole (501b). Assembly may furthermore include a second motor (415), where the second motor (415) is secured to the hole (501a) of the coupler (501). Assembly may in addition include a drive shaft (505).

In one general aspect, third motorized joint assembly may include a third pulley (419). Third motorized joint assembly may also include a third spring (421). Assembly may furthermore include a third encoder assembly (511). Assembly may in addition include a third cable (422), where the third cable (422) circumscribes the third pulley (419) in a counterclockwise direction. Assembly may moreover include a third capstan (425), where the third capstan (425) is disposed tangential to a circumference of the third pulley (419). Assembly may also include a coupler (503) having a first end (504a) and a second end (504b), where the first end (504a) includes plurality of hole (503a) and (503c), and the second end (504b) includes a hole (503b). Assembly may furthermore include a third motor (423), where the third motor (423) is secured to the hole (503a) of the coupler (503). Assembly may in addition include a drive shaft (507).

BRIEF DESCRIPTION OF THE DRAWINGS

To further clarify advantages and features of the present disclosure, a more particular description of the disclosure will be rendered by reference to specific embodiments thereof, which is illustrated in the appended drawings. It is appreciated that these drawings depict only typical embodiments of the disclosure and are therefore not to be considered limiting of its scope. The disclosure will be described and explained with additional specificity and detail with the accompanying drawings in which.

To further clarify advantages and features of the present disclosure, a more particular description of the disclosure will be rendered by reference to specific embodiments thereof, which is illustrated in the appended drawings. It is appreciated that these drawings depict only typical embodiments of the disclosure and are therefore not to be considered limiting of its scope. The disclosure will be described and explained with additional specificity and detail with the accompanying drawings in which.

DETAILED DESCRIPTION OF DISCLOSURE

Figure 1:
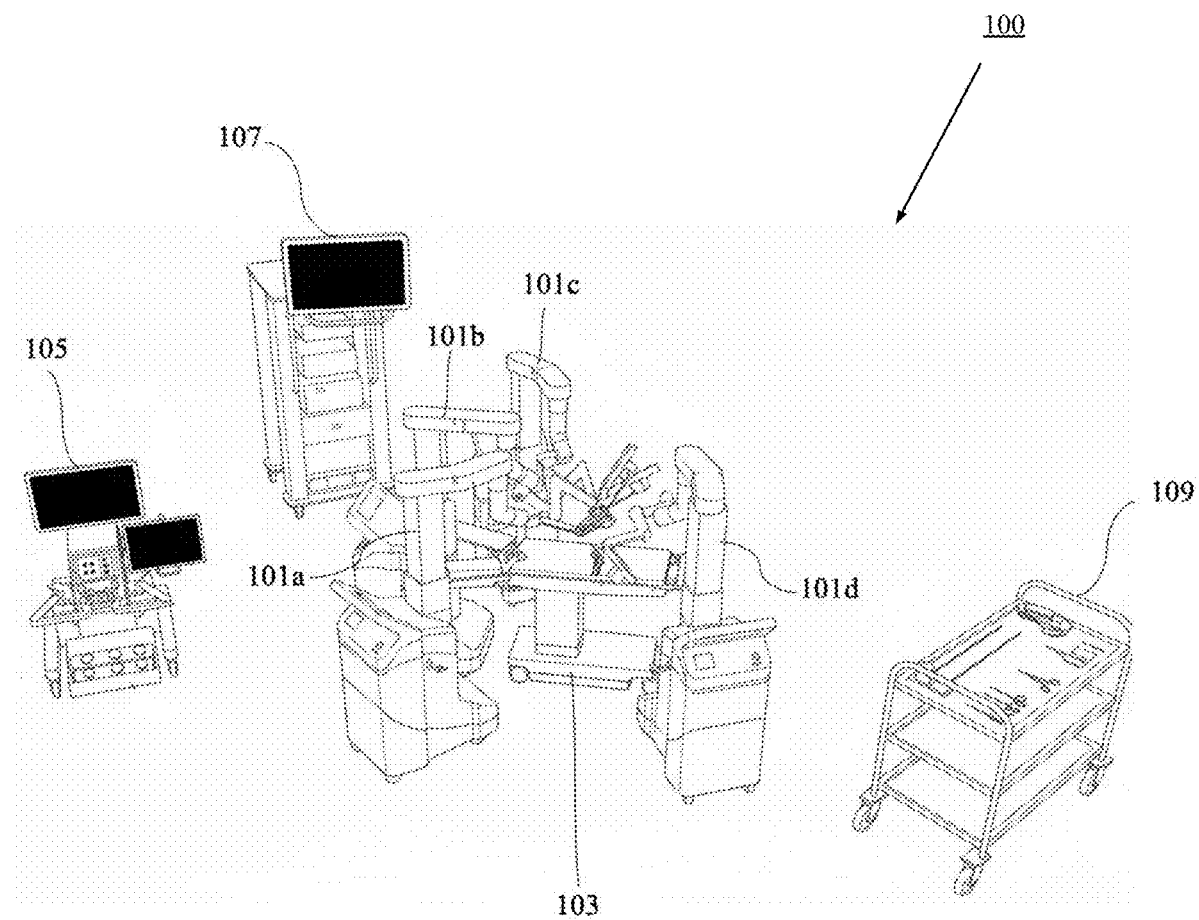
FIG. 1 illustrates an example implementation of a multi-arm teleoperated surgical system which can be used with one or more features in accordance with an embodiment of the disclosure.

For the purpose of promoting an understanding of the principles of the disclosure, reference will now be made to the embodiment illustrated in the drawings and specific language will be used to describe the same. It will nevertheless be understood that no limitation of the scope of the disclosure is thereby intended, such alterations and further modifications in the illustrated system, and such further applications of the principles of the disclosure as illustrated therein being contemplated as would normally occur to one skilled in the art to which the disclosure relates.

Any alterations and further modifications to the described console system, methods, and any further application of the principles of the present disclosure are fully contemplated as would normally occur to one skilled in the art to which the disclosure relates. In particular, it is fully contemplated that the features, components, and/or steps described with respect to one embodiment may be combined with the features, components, and/or steps described with respect to other embodiments of the present disclosure. In addition, dimensions provided herein are for specific examples and it is contemplated that different sizes, dimensions, and/or ratios may be utilized to implement the concepts of the present disclosure. To avoid needless descriptive repetition, one or more components or actions described in accordance with one illustrative embodiment can be used or omitted as applicable from other illustrative embodiments. For the sake of brevity, the numerous iterations of these combinations will not be described separately. For simplicity, in some instances the same reference numbers are used throughout the drawings to refer to the same or like parts.

The embodiments below will describe various components of the console system in terms of their state in three-dimensional space. As used herein, the term "position" refers to the location of an object or a portion of an object in a three-dimensional space (e.g., three degrees of translational freedom along cartesian x, y, z coordinates). As used herein, the term "orientation" refers to the rotational placement of an object or a portion of an object (three degrees of rotational freedom—e.g., roll, pitch, and yaw). As used herein, the term "pose" refers to the position of an object or a portion of an object in at least one degree of translational freedom and to the orientation of that object or portion of the object in at least one degree of rotational freedom (up to six total degrees of freedom).

It will be understood by those skilled in the art that the foregoing general description and the following detailed description are exemplary and explanatory of the disclosure and are not intended to be restrictive thereof. Throughout the patent specification, a convention employed is that in the appended drawings, like numerals denote like components.

Reference throughout this specification to "an embodiment", "another embodiment", "an implementation", "another implementation" or similar language means that a particular feature, structure, or characteristic described in connection with the embodiment is included in at least one embodiment of the present disclosure. Thus, appearances of the phrase "in an embodiment", "in another embodiment", "in one implementation", "in another implementation", and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures proceeded by "comprises . . . a" does not, without more constraints, preclude the existence of other devices or other sub-systems or other elements or other structures or additional devices or additional sub-systems or additional elements or additional structures.

Unless otherwise defined, all technical and scientific terms used herein have the same meaning as commonly understood by one of ordinary skill in the art to which this disclosure belongs. The apparatus, system, and examples provided herein are illustrative only and not intended to be limiting.

The terms "a" and "an" herein do not denote a limitation of quantity, but rather denote the presence of at least one of the referenced items. Further, the term sterile barrier and sterile adapter denotes the same meaning and may be used interchangeably throughout the description.

Embodiments of the disclosure will be described below in detail with reference to the accompanying drawings.

FIG. 1 illustrates an example implementation of a multi-arm teleoperated surgical system which can be used with one or more features in accordance with an embodiment of the disclosure. Specifically, FIG. 1 illustrates the multi-arm teleoperated surgical system (100) having four robotic arms (101a), (101b), (101c), (101d) which are mounted on four robotic arm carts. The four robotic arms (101a), (101b), (101c), (101d) placed on the four robotic arm carts are placed around an operating table (103). The four-robotic arms (101a), (101b), (101c), (101d) as depicted in FIG. 1 is for illustration purposes only and the number of robotic arms may vary depending upon the type of surgery. The robotic arms (101a), (101b), (101c), (101d) may be separately mounted on the four robotic arm carts and the robotic arms (101a), (101b), (101c), (101d) mechanically and/or operationally connected with each other. Alternatively, in other configuration, the robotic arms (101a), (101b), (101c), (101d) may be connected to a central body (which may be single cart) such that the robotic arms (101a), (101b), (101c), (101d) branch out of the central body. Further, the multi-arm teleoperated surgical system (100) may include a console system (105), a vision cart (107) and a surgical instrument and accessory table (109).

Figure 2:
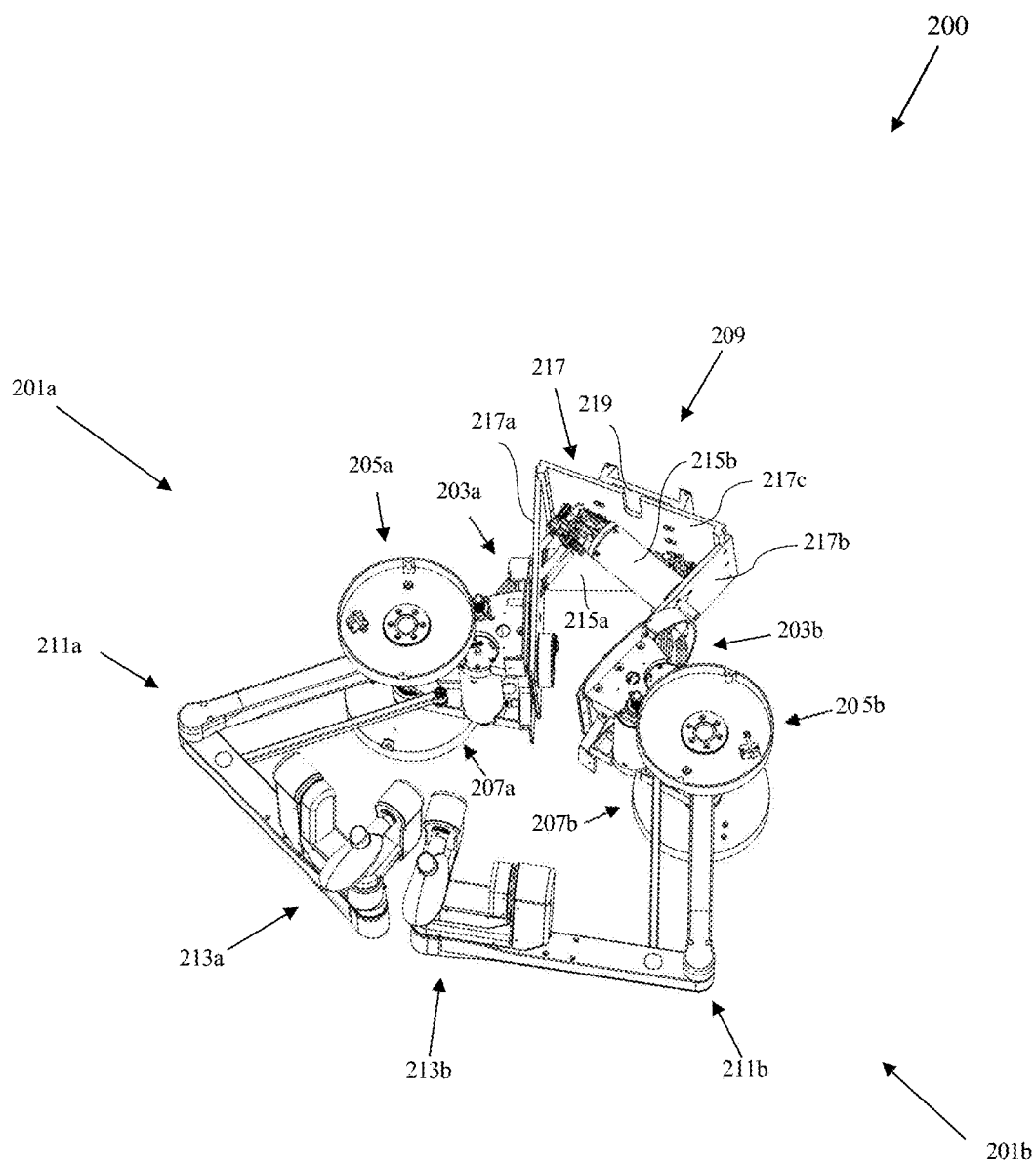
FIG. 2 illustrates a perspective view of an example hand controller assembly of a console system in accordance with an embodiment of the disclosure.
Figure 3:
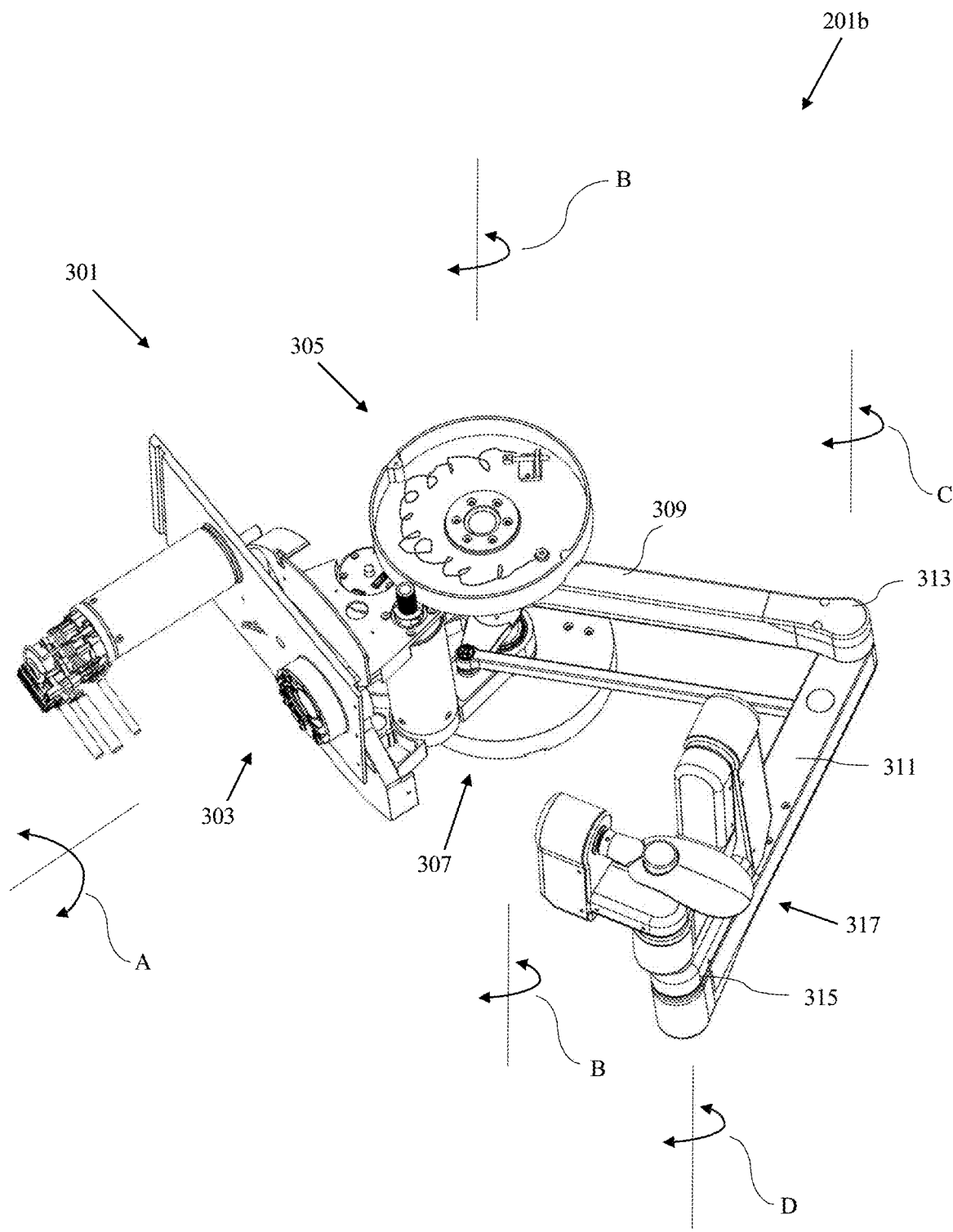
FIG. 3 illustrates a perspective view of a right-hand controller in accordance with an embodiment of the disclosure.
Figure 4A:
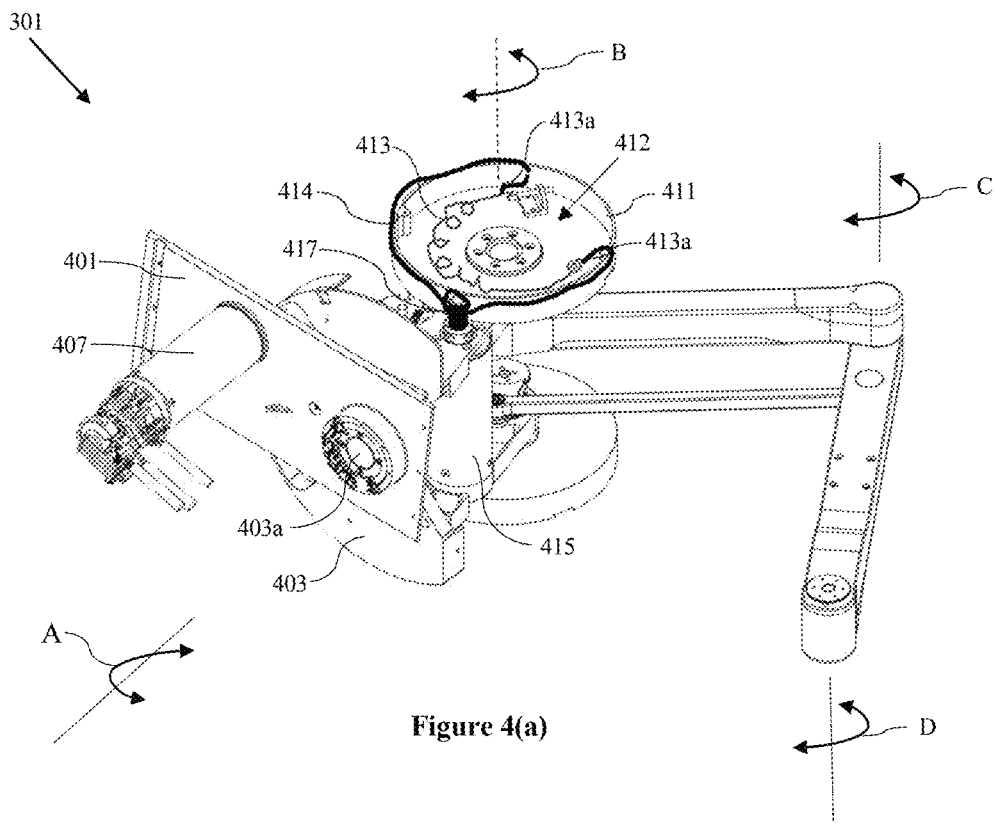
FIG. 4(a) illustrates a second perspective view of the right-hand controller in accordance with an embodiment of the disclosure.
Figure 4B:
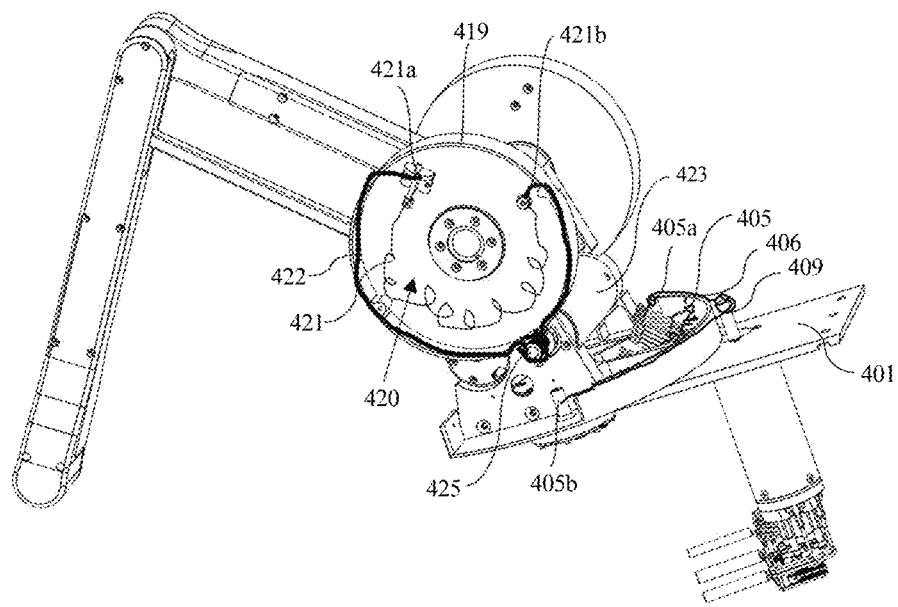
FIG. 4(b) illustrates a rear perspective view of the right-hand controller in accordance with an embodiment of the disclosure.

FIG. 2 illustrates a perspective view of an example hand controller assembly of a console system in accordance with an embodiment of the disclosure. The hand controller assembly (200) included a left-hand controller (201a) and a right-hand controller (201b). The left-hand controller (201a) and the right-hand controller (201b) are similar in functionality, dimensions and components. Henceforth, in the description, only one hand controller is described, and it should not be considered as a limitation that the same explanation may not be applied to the other hand controller. More specifically, FIG. 3 to FIG. 5 illustrates right-hand controller (201b) and its various components, and the same explanation will also be applicable for left-hand controller (201a) without any limitations.

According to an embodiment, the hand controller assembly (200) further includes a plurality of motorized joint assemblies. In an example, the left-hand controller (201a) includes three motorized joint assembly, i.e., a first motorized joint assembly (203a), a second motorized joint assembly (205a) and a third motorized joint assembly (207a). Similarly, the right-hand controller (201b) also includes three motorized joint assembly, i.e., a first motorized joint assembly (203b), a second motorized joint assembly (205b) and a third motorized joint assembly (207b).

The hand controller (200) may comprise a backend assembly (209), a plurality of link members (211a) for left-hand controller (201a) and a plurality of link members (211b) for right-hand controller (201b). The plurality of link members (211a) of the left-hand controller (201a) coupled to one another to form a linkage and the plurality of links members (211b) of the right-hand controller (201b) coupled to one another to form a linkage. Proximal end of the plurality of link member (211a) and (211b) is operationally secured to the backend assembly (209) and distal end of the plurality of link member (211a) and (211b) is operationally secured to a gimbal assembly (213a) and (213b) respectively. More specifically, distal end of the left-hand link member (211a) is operationally secured to the gimbal assembly (213a) and distal end of the right-hand link member (211b) is operationally secured to the gimbal assembly (213b).

The backend assembly (209) includes plurality of motors (215a) (for left-hand controller (201a)) and (215b) (for right hand controller (201b)) secured to a mounting plate (217). The mounting plate (217) includes a left-hand mounting plate (217a), a right-hand mounting plate (217b) and a center mounting plate (217c). The motor (215a) is secured to the left-hand mounting plate (217a) and the motor (215b) is secured to the right-hand mounting plate (217b) respectively. The one end of the mounting plates (217a) and (217b) are secured together by another mounting plate (217c). The one end may be a distal end of the mounting plates (217a) and (217b) which are secured to another mounting plate (217c). A dovetail mount (219) is secured to the mounting plate (217c). The dovetail mount (219) facilitates the hand controller assembly (200) to easily mount in the console system (105) (as shown in FIG. 1). The mounting of the motors (215a) and (2015b) to the mounting plate (217a) and (2017b) respectively, will facilitate counterbalancing of the left-hand controller (211a) and the right-hand controller (211b).

FIG. 3 illustrates a perspective view of a right-hand controller in accordance with an embodiment of the disclosure. The right-hand controller (201b) may also be referred to as hand controller in the explanation now onwards. A proximal end of the hand controller (201b) includes a backend assembly (301). The backend assembly (301) includes a plurality of motorized joints to facilitate a translational movement of the hand controller (201b) in any of the x, y and z-axis of a cartesian coordinates. The plurality of motorized joints may include a capstan and pulley mechanism to achieve the desired translational movement of the hand controller (201b) in x, y and z-axis of the cartesian coordinates. As used herein, the term 'left' and 'right' refers to the movement of the surgeon hand while holding the hand controller assembly (200), in x-axis (+x-axis & −x-axis) of the cartesian coordinates. The term 'in' and 'out' refers to the movement of the surgeon hand while holding the hand controller assembly (200), in y-axis (+y-axis & −y-axis) of the cartesian coordinates. The term 'upward' and 'downwards' refers to the movement of the surgeon hand while holding the hand controller assembly (200), in z-axis (+z-axis & −z-axis) of the cartesian coordinates.

In an embodiment, a first motorized joint assembly (303) may facilitate the movement of the hand controller (201b) in +z-axis and −z-axis of the cartesian coordinates (upward & downward) by rotating the first motorized joint assembly (303) along an axis of rotation 'A'. A second motorized joint assembly (305) may facilitate the movement of the hand controller (201b) in +x-axis and −x-axis of the cartesian coordinates (right & left) by rotating the second motorized joint assembly (305) along an axis of rotation 'B'. A third motorized joint assembly (307) may facilitate the movement of the hand controller (201b) in +y-axis and −y-axis of the cartesian coordinates (in and out) by rotating the third motorized joint assembly (307) along an axis of rotation 'B'. The hand controller (201b) may include a plurality of link members (211b) (as shown in FIG. 2) such as a first elbow (309) and a second elbow (311). Proximal end of the first elbow (309) is operationally secured to the backend assembly (301) and distal end of the first elbow (309) is operationally secured to proximal end of the second elbow (311) at a rotational joint (313). Further, proximal end of the second elbow (311) which is secured to distal end of the first elbow (309), is configured to rotate at an axis of rotation 'C'. Distal end of the second elbow (311) is secured to a gimbal assembly (317) at a rotational joint (315).

In an example embodiment, the gimbal assembly (317) is secured to a rotational joint (315). The gimbal assembly (317) is configured to rotate at the axis of rotation 'D'. The surgeon, while performing surgery, maneuvers the gimbal assembly (317) in various positions and orientations. The translational motion of the surgeon's hand in x, y and z-axes of the cartesian coordinates (which will translate in the movement of the robotic arms 101*a*-101*d* as shown in FIG. 1) while holding the gimbal assembly (317) is translated by the second elbow (311) and the first elbow (309) and thereby the rotational movement of the first motorized joint assembly (303), the second motorized joint assembly (305) and the third motorized joint assembly (307). The rotational movement of the surgeon's hand while holding the gimbal assembly (317) will translate to the distal end of the surgical instruments such as pitch, yaw and roll.

In an embodiment, when the surgeon holds the gimbal assembly (317) and tries to move his/her hand substantially in 'upward' and/or 'downward' directions (+z and −z-axis of the cartesian coordinates), a motion translates from the second elbow (311) and the first elbow (309) to facilitate the rotation of the first motorized joint assembly (303) in the axis of rotation 'A'. At the same time, the second motorized joint assembly (305) and the third motorized joint assembly (307) may be configured to remain substantially stationary and also, the rotational joint (313) and (315) may be configured to remain substantially stationary when the surgeon tries to move his/her hand in substantially in 'upward' and/or 'downward' directions (+z and −z-axis of the cartesian coordinates).

In a specific embodiment, when the surgeon holds the gimbal assembly (317) and tries to move his/her hand purely in 'upward' and/or 'downward' directions (+z and −z axis of the cartesian coordinates), a motion translates from the second elbow (311) and the first elbow (309) to facilitate the rotation of the first motorized joint assembly (303) in the axis of rotation 'A'. At the same time, the second motorized joint assembly (305) and the third motorized joint assembly (307) may be configured to remain completely stationary and also, the rotational joint (313) and (315) may be configured to remain completely stationary when the surgeon tries to move his/her hand in substantially in 'upward' and/or 'downward' directions (+z and −z-axis of the cartesian coordinates).

Further, when the surgeon holds the gimbal assembly (317) and tries to move his/her hand substantially in 'right' and/or 'left' directions (+x and −x-axis of the cartesian coordinates), a motion translates from the second elbow (311) and the first elbow (309) to facilitate the rotation of the second motorized joint assembly (305) in the axis of rotation 'B'. The first motorized joint assembly (303) and the third motorized joint assembly (307) may remain substantially stationary. At the same time, the first motorized joint assembly (303) and the third motorized joint assembly (307) may be configured to remain substantially stationary and also, the rotational joint (313) and (315) may be configured to remain substantially stationary when the surgeon tries to move his/her hand in substantially in 'right' and/or 'left' directions (+x and −x-axis of the cartesian coordinates).

In a specific embodiment, when the surgeon holds the gimbal assembly (317) and tries to move his/her hand purely in 'right' and/or 'left' directions (+x and −x-axis of the cartesian coordinates), a motion translates from the second elbow (311) and the first elbow (309) to facilitate the rotation of the second motorized joint assembly (305) in the axis of rotation 'B'. The first motorized joint assembly (303) and the third motorized joint assembly (307) may remain completely stationary. At the same time, the first motorized joint assembly (303) and the third motorized joint assembly (307) may be configured to remain completely stationary and also, the rotational joint (313) and (315) may be configured to remain completely stationary when the surgeon tries to move his/her hand purely in 'right' and/or 'left' directions (+x and −x-axis of the cartesian coordinates).

Furthermore, when the surgeon holds the gimbal assembly (317) and tries to move his/her hand substantially in 'in' and 'out' directions (+y and −y-axis of the cartesian coordinates), only the second elbow (311) participates in the movement to facilitate the rotation of the third motorized joint assembly (307) in the axis of rotation 'B'. The first motorized joint assembly (303) and the second motorized joint assembly (305) may be configured to remain substantially stationary. At the same time, the rotational joint (315) may be configured to remain fixed, and the rotational joint (313) rotates along the axis of rotation 'C' when the surgeon tries to move his/her hand in substantially 'in' and 'out' directions.

In a specific embodiment, when the surgeon holds the gimbal assembly (317) and tries to move his/her hand purely in 'in' and 'out' directions (+y and −y-axis of the cartesian coordinates), only the second elbow (311) participates in the movement to facilitate the rotation of the third motorized joint assembly (307) in the axis of rotation 'B'. The first motorized joint assembly (303) and the second motorized joint assembly (305) may be configured to remain completely stationary. At the same time, the rotational joint (315) may be configured to remain fixed, and the rotational joint (313) rotates along the axis of rotation 'C' when the surgeon tries to move his/her hand in purely 'in' and 'out' directions.

The surgeon, while performing the surgery may maneuver the hand controller (201*b*) in different directions and orientations while holding the gimbal assembly (317). The hand controller (201*b*) may be maneuvered in the x, y and z-axes of the cartesian coordinates such that the motion of the hand controller (201*b*) in x, y and z directions may be dynamic within a workspace of the hand controller (201*b*). To achieve the dynamic movement of the hand controller in the x, y, and z directions, all the three motorized joint assemblies (303, 305 and 305) may be configured to participate/rotate concurrently.

As illustrated in FIGS. 4(*a*) and 4(*b*), the first motorized joint assembly (303) (as explained in FIG. 3), the backend assembly (301) comprises a first pulley (403) which may be secured to an interior side of plate (401) (referred as right-hand mounting plate (217*b*) in FIG. 2). The first pulley (403) may be in circular or partially circular shape or in any other shape, as may be required. The first pulley (403) may be either of a segmented construction or solid, or perforated, or any other construction, as may be required. The first pulley (403) may include a first spring (405) in a recess of the segmented construction at the interior side. A first cable (406) is secured to one end (405*a*) of the first spring (405) and the said first cable (406) circumscribes the first pulley (403) in a counter-clockwise direction. In other implementations, the first cable (406) may circumscribe the first pulley (503) in a clockwise direction based on the design requirements. The first cable (406) wraps a first capstan (409) (the first capstan (409) disposed substantially tangential to the circumference of the first pulley (403)) several times and secured to another end (405*b*) of the first pulley (403). The first capstan (409) is mounted to a first motor (407) to facilitate the rotational movement of the first motorized joint assembly (303) (as explained in FIG. 3) along the axis of rotation 'A'.

Further, the backend assembly (301) comprises a second pulley (411). The second pulley (411) may be in circular or partially circular shape. The second pulley (411) at its exterior surface includes a recess (412) and a second spring (413) is disposed within the recess (412). A second cable (414) is secured to one end (413a) of the second spring (413) and the said second cable (414) circumscribes the second pulley (411) in counterclockwise direction. In other implementations, the said second cable (414) may circumscribe the second pulley (411) in clockwise direction based on the design requirement. The second cable (414) wraps to a second capstan (417) (the second capstan (417) disposed substantially tangential to the circumference of the second pulley (411)) several times and secured to another end (413b) of the second pulley (411). The second capstan (417) is mounted to a second motor (415) to facilitate the rotational movement of the second motorized joint assembly (305) (as explained in FIG. 3) along the axis of rotation 'B'.

Furthermore, the backend assembly (301) comprises a third pulley (419). The third pulley (419) may be in circular or partially circular shape. The third pulley (419) at its interior surface includes a recess (420) and a third spring (421) is disposed within the recess (420). A third cable (422) is secured to one end (421a) of the third spring (421) and the said third cable (422) circumscribes the third pulley (419) in counterclockwise direction. In other implementations, the said third cable (422) circumscribes the third pulley (419) in clockwise direction based on the design requirements. The third cable (422) is wrapped to a third capstan (425) (the third capstan (425) disposed substantially tangential to the circumference of the third pulley (419)) several times and secured to another end (421b) of the third pulley (419). The third capstan (425) is mounted to a third motor (423) to facilitate the rotation movement of the third motorized joint assembly (307) (as explained in FIG. 3) along the axis of rotation 'B'.

Figure 5A:
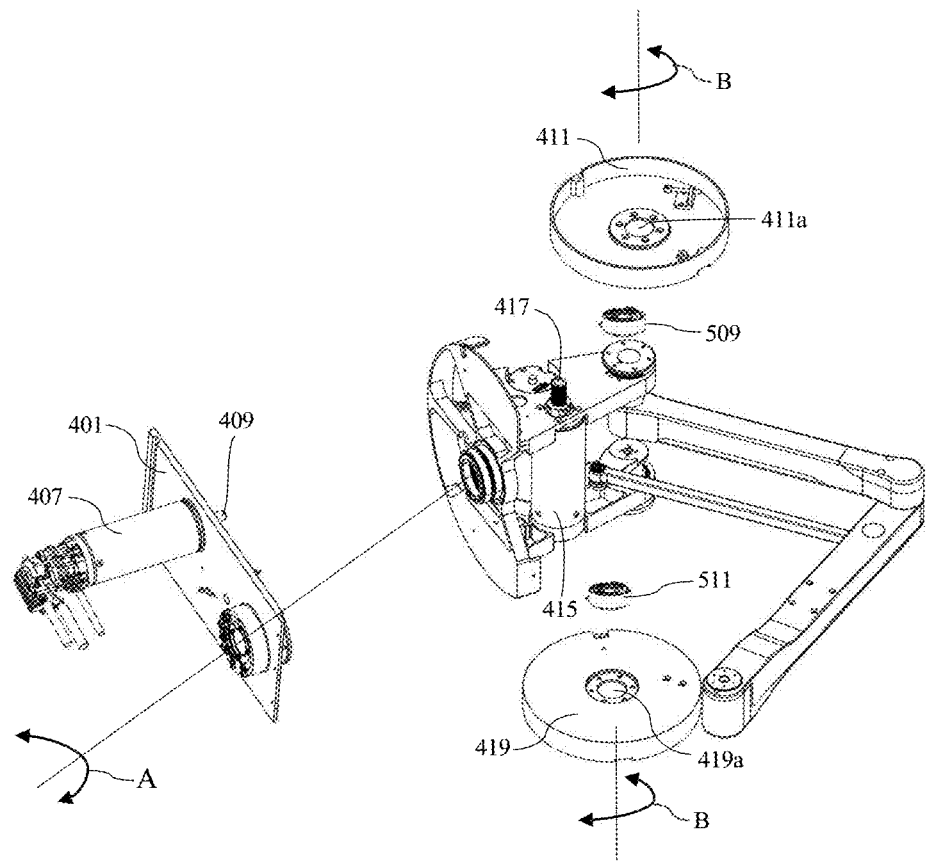
FIG. 5(a) illustrates an exploded view of the right-hand controller in accordance with an embodiment of the disclosure.
Figure 5B:
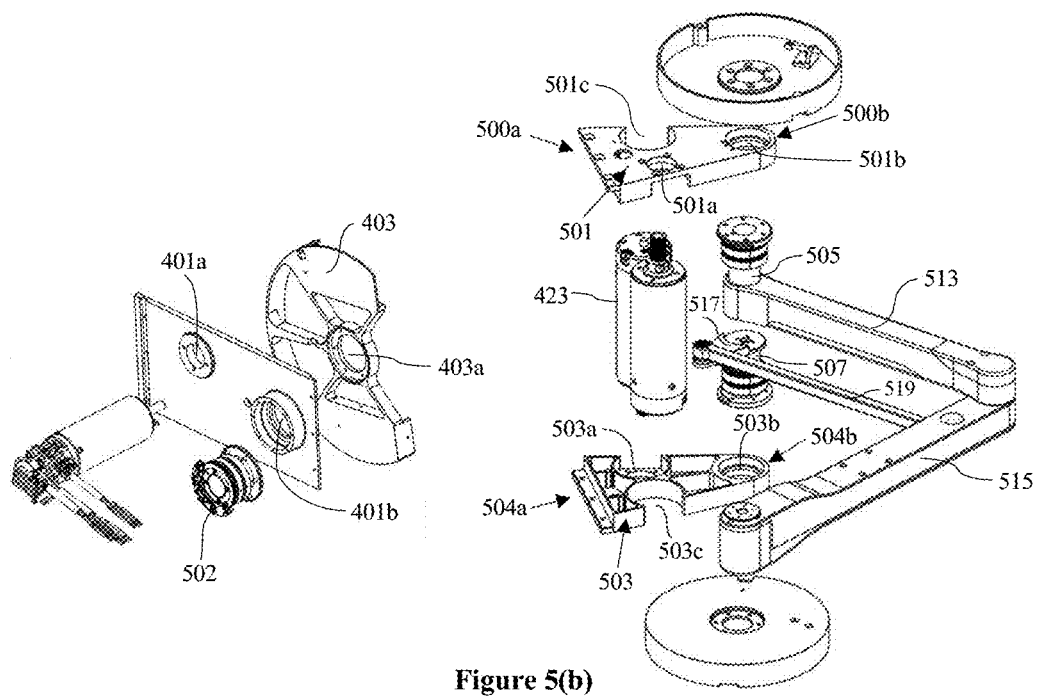
FIG. 5(b) illustrates second exploded view of the right-hand controller in accordance with an embodiment of the disclosure.

Now referring to FIGS. 5(a) and (b), some components in FIGS. 5(a) and (b) are not labelled/shown such as springs, cables, etc., and the same can be referred to from the referral numeral of the previous figures. The first elbow may interchangeably be refereed by the referral numerals (309) or (513) and the second elbow may interchangeably be refereed by the referral numerals (311) and (515). The first motorized joint assembly (303) (as explained in FIGS. 3, 4(a) and 4(b)) includes the plate (401) (the plate (401) is common in all the three motorized joint assemblies (303), (305) and (307)), the first pulley (403), wherein a circular profile (403a) disposed substantially to a center of a diameter of the first pulley (403), the first spring (405), the first cable (406), the first capstan (409), the first motor (407) and a first encoder assembly (502). The plate (401) includes plurality of holes to accommodate the first capstan (409), the first encoder assembly (502) and for screwing/fastening the first pulley (403) to the plate (401). In a specific embodiment, the plate (401) at its horizontal end, includes a hole (401a) and a hole (401b). The hole (401a) at a first horizontal end of the plate (401) may accommodate the first capstan (409) and the hole (401b) at a second horizontal end of the plate (401) may accommodate the first encoder assembly (502). The encoder assembly (502), and the hole (401b) and the circular profile (403a) are coaxially configured. The first motor (407) is secured to a anterior side of the plate (401) around the hole (401a) and the first capstan (409) configured one end of the first motor (407), protrudes through the hole (401a). The hole (401b) may also be configured to secure the first encoder assembly (502), the first pulley (403) to the plate (401) in the same axis so as to facilitate the rotational movement of the first motorized joint assembly (303) along the axis of rotation 'A'.

The second motorized joint assembly (305) (as explained in FIGS. 3, 4(a) and 4(b)) includes the plate (401), the second pulley (411) and a hole (411a) disposed substantially to a center of a diameter of the second pulley (411). Further, the second motorized joint assembly (305) includes a coupler (501) having a first end (500a) and a second end (500b) wherein, the first end (500a) includes plurality of holes such as a (501a) and a hole (501c) disposed opposite to each other (the hole (501c) may be in semicircle). The second end (500b) of the coupler (501) includes a hole (501b). Furthermore, the second motorized joint assembly (305) includes the second motor (415) secured to the hole (501a) of the coupler (501). The first end (500a) of the coupler (501) is secured to one end of the posterior side of the first pulley (403). The drive shaft (505) upper end comprises of a circular profile, wherein the circular profile of the drive shaft (505) upper end is secured to the second pulley (411) around the hole (411a). The circular profile/the hole (501a) at the first end (500a) of the coupler (501) is configured to accommodate the second capstan (417), wherein the second capstan (417) is secured to one end of the second motor (415). The circular profile/the hole (501b) at the second end (500b) of the coupler (501) may be bigger than the circular profile/the hole (501a) at the first end (500a) of the coupler (501). A semicircular profile/ semicircular hole (501c) is configured to accommodate distal end of the third motor (423). The drive shaft (505) is disposed in the hole (501b) such that its lower end is secured to the proximal end of the first elbow (513). The rotation of the drive shaft (505) is identified by a second encoder assembly (509). The second pulley (411), the hole (411a) are placed in the vertical axis (at the axis of rotation 'B') of the drive shaft (505). More specifically, the hole (411a), the second encoder assembly (509) and the hole (501b) of the coupler (501) are coaxially placed/secured in the vertical axis (at the axis of rotation 'B') of the drive shaft (505).

The third motorized joint assembly (307) (as explained in FIGS. 3, 4(a) and 4(b)) includes the plate (401), the third pulley (419), a hole (419a) disposed substantially to the center of a diameter of the third pulley (419). Further, the third motorized joint assembly (307) includes a coupler (503) having a first end (504a) and a second end (504b), wherein the first end (504a) includes plurality of holes such as a (503a) and a hole (503c) disposed opposite to each other (the hole (503c) may be in semicircle). Furthermore, the third motorized joint assembly (307) includes the third motor (423) secured to the hole (503a) of a coupler (503). The first end (504a) of the coupler (503) is secured to one end of the posterior side of the first pulley (403). The first end (500a) of the coupler (501) and the first end (504a) of the coupler (503) are secured to the posterior side of the first pulley (403) such that the first end (500a) and the first end (504a) are disposed opposite to each other. The drive shaft (507) lower end comprises of a circular profile, wherein the circular profile of the drive shaft (507) lower end is secured to the third pulley (419) around the hole (419a). The circular profile/the hole (503a) at the first end (504a) of the coupler (503) is configured to accommodate the third capstan (425) (the third capstan (425) is shown in FIG. 4(b)), wherein the third capstan (425) is secured to one end of the third motor (423). The circular profile/the hole (503b) at the second end (504b) of the coupler (503) may be bigger than the circular profile/the hole (503a) at the first end (504a) of the coupler (503). A semicircular profile/semicircular hole (503c) is configured to accommodate distal end of the second motor (415). A drive shaft (507) is disposed in the hole (503b) such that its upper end is secured to a link (517). The link (517) is secured to one end of a shaft (519) and other end of the shaft (519) is secured to the second elbow (515). The rotation of the drive shaft (507) is identified by a third encoder assembly (511). The third pulley (419), the hole (419a) are placed in the vertical axis (at the axis of rotation 'B') of the drive shaft (507). More specifically, the hole (419a), the third encoder assembly (411) and the hole (503b) of the coupler (503) are placed in the vertical axis (at the axis of rotation 'B') of the drive shaft (507).

In an embodiment, when the surgeon holds the gimbal assembly (317) (the gimbal assembly (317) is shown in FIG. 3) and tries to move his/her hand substantially and/or purely in 'right' and/or 'left' directions (+x and −x axis of the cartesian coordinates), a motion translates from the second elbow (515) and the first elbow (513) to facilitate the rotation of the drive shaft (505) in the axis of rotation 'B'. As the drive shaft (505) upper end is secured the second pulley (411) and the dive shaft (505) lower end is secured to proximal end of the first elbow, therefore, the rotation of the drive shaft (505) facilitate the rotation of the second motorized joint assembly (305) along the axis of rotation 'B'. The rotation of the second pulley (411) is identified by the second encoder assembly (509) and the second motor (415) with second capstan (417), the second cable (414) are configured to assist the motion of the second motorized joint assembly (305) along the axis of rotation 'B'.

In another an embodiment, when the surgeon holds the gimbal assembly (317) (the gimbal assembly (317) is shown in FIG. 3) and tries to move his/her hand substantially and/or purely in 'in' and/or 'out' directions (+y and −y axis of the cartesian coordinates), a motion translates from the second elbow (515) and the shaft (519) to facilitate the rotation of the drive shaft (507) in the axis of rotation 'B'. As the drive shaft (507) lower end is secured the third pulley (419) and the dive shaft (507) upper end is secured to one end of the link (517) and the other end of the link (517) is secured to the shaft (519), therefore, the rotation of the drive shaft (507) facilitate the rotation of the third motorized joint assembly (307) along the axis of rotation 'B'. The rotation of the third pulley (419) is identified by the third encoder assembly (511) and the third motor (423) with third capstan (425), the third cable (422) are configured to assist the motion of the third motorized joint assembly (307) along the axis of rotation 'B'.

The foregoing descriptions of exemplary embodiments of the present disclosure have been presented for purposes of illustration and description. They are not intended to be exhaustive or to limit the disclosure to the precise forms disclosed, and obviously many modifications and variations are possible in light of the above teaching. The exemplary embodiment was chosen and described in order to best explain the principles of the disclosure and its practical application, to thereby enable others skilled in the art to best utilize the disclosure and various embodiments with various modifications as are suited to the particular use contemplated. It is understood that various omissions, substitutions of equivalents are contemplated as circumstance may suggest or render expedient but is intended to cover the application or implementation without departing from the spirit or scope of the claims of the present disclosure.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

While specific language has been used to describe the disclosure, any limitations arising on account of the same are not intended. As would be apparent to a person in the art, various working modifications may be made to the apparatus in order to implement the inventive concept as taught herein.

We claim:

1. A hand controller assembly of a console system, comprising:
    a backend assembly, wherein the backend assembly is configured to facilitate movement of the hand controller assembly in x, y, and z-coordinate axes;
    a left-hand controller, wherein the left-hand controller includes plurality of link members coupled to one another to form a linkage, wherein proximal end of the plurality of link members is operationally secured to the backend assembly and distal end of the plurality of link member is operationally secured to a gimbal assembly;
    a right-hand controller, wherein the right-hand controller includes a plurality of link members coupled to one another to form a linkage, wherein a proximal end of the plurality of link members is operationally secured to the backend assembly and distal of the plurality of link member is operationally secured to a gimbal assembly; and
    a dovetail mount is secured to a mounting plate, wherein the dovetail mount is configured to releasably secure the hand controller assembly in the console system.

2. The hand controller as claimed in claim 1, wherein the backend assembly further comprising:
    a motor secured to a mounting plate and a motor secured to a mounting plate such as to counterbalance the left-hand controller and the right-hand controller.

3. The hand controller as claimed in claim 1, wherein the plurality of link members further comprising:
    a first elbow having a proximal end and a distal end; and
    a second elbow, wherein distal end of the first elbow is rotationally secured to proximal end of the second elbow.

4. The hand controller as claimed in claim 3, wherein proximal end of the first elbow is secured to a lower end of a drive shaft and the drive shaft upper end is secured to a second pulley, around a hole.

5. The hand controller as claimed in claim 4, wherein the drive shaft comprises a drive shaft upper end and a drive shaft lower end, wherein and the drive shaft upper end comprises of a circular profile.

6. The hand controller as claimed in claim 3, wherein the second elbow is secured to one end of a shaft and other end of the shaft is secured to one end of a link and other end of the link is secured to upper end drive shaft and the drive shaft lower end is secured to a third pulley, around a hole.

7. The hand controller as claimed in claim 6, wherein a drive shaft comprises a drive shaft upper end and a drive shaft lower end, wherein and the drive shaft lower end comprises of a circular profile.

8. The hand controller as claimed in claim 1, wherein the backend assembly further comprising:
    a first motorized joint assembly, wherein the first motorized joint assembly is configured to facilitate movement of the hand controller in z-axis of a cartesian coordinates;

a second motorized joint assembly, wherein the second motorized joint assembly is configured to facilitate movement of the hand controller in an x-axis of the cartesian coordinates; and a third motorized joint assembly, wherein the third motorized joint assembly is configured to facilitate movement of the hand controller in y-axis of the cartesian coordinates.

9. The hand controller as claimed in claim 8, wherein the second motorized joint assembly and the third motorized joint assembly are configured to rotate along an axis of rotation 'B'.

10. A first motorized joint assembly of a hand controller, comprising: a plate;
   a first pulley; a first spring;
   a first encoder assembly;
   a first cable, wherein the first cable circumscribes the first pulley in a counterclockwise direction;
   a first capstan, wherein the first capstan is disposed tangential to a circumference of the first pulley; and
   a first motor, wherein the first motor is secured to an anterior side of the plate.

11. The first motorized joint assembly as claimed in claim 10, wherein the plate further comprises a plurality of holes disposed at a horizontal end of the plate.

12. The first motorized joint assembly as claimed in claim 11, wherein the hole is configured to accommodate the capstan (409).

13. The first motorized joint assembly as claimed in claim 11, wherein the hole is configured to accommodate the first encoder assembly, a circular profile of the first pulley, in a same axis coaxially.

14. A second motorized joint assembly of a hand controller, comprising: a second pulley;
   a second spring;
   a second encoder assembly;
   a second cable, wherein the second cable circumscribes the second pulley in a counterclockwise direction;
   a second capstan, wherein the second capstan is disposed tangential to a circumference of the second pulley;
   a coupler having a first end and a second end, wherein the first end includes plurality of hole and, and the second end includes a hole;
   a second motor, wherein the second motor is secured to the hole of the coupler; and
   a drive shaft.

15. The second motorized joint assembly as claimed in claim 14, wherein a circular profile is disposed to center of a diameter of the second pulley.

16. The second motorized joint assembly as claimed in claim 14, wherein the second pulley at its exterior surface includes a recess.

17. The second motorized joint assembly as claimed in claim 14, wherein the second spring is disposed within a recess.

18. The second motorized joint assembly as claimed in claim 14, wherein the second cable is secured to one end of the second spring and the said second cable circumscribes the second pulley in counterclockwise direction and the second cable wraps to the second capstan several times and then secured to another end of the second pulley.

* * * * *